United States Patent
Zhang et al.

(10) Patent No.: US 9,647,741 B2
(45) Date of Patent: May 9, 2017

(54) PHYSICAL UPLINK CONTROL CHANNEL (PUCCH) RESOURCE MAPPING WITH TRANSMIT DIVERSITY

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 12/840,162

(22) Filed: Jul. 20, 2010

(65) Prior Publication Data

US 2011/0026631 A1 Feb. 3, 2011

Related U.S. Application Data

(60) Provisional application No. 61/230,666, filed on Jul. 31, 2009.

(51) Int. Cl.
*H04W 4/00* (2009.01)
*H04B 7/06* (2006.01)

(52) U.S. Cl.
CPC ......... *H04B 7/0613* (2013.01); *H04B 7/0691* (2013.01); *H04B 7/0693* (2013.01); *H04B 7/0619* (2013.01)

(58) Field of Classification Search
CPC ................................ H04W 40/00; H04B 7/02
USPC ............... 370/254, 310, 328–338, 260–269; 375/299, 267; 455/445–450
See application file for complete search history.

(56) References Cited

U.S. PATENT DOCUMENTS

| | | | |
|---|---|---|---|
| 8,260,356 B2* | 9/2012 | Nam | H04B 7/043 370/328 |
| 2007/0249402 A1* | 10/2007 | Dong | H04B 7/0408 455/562.1 |
| 2008/0212506 A1 | 9/2008 | Lee et al. | |
| 2009/0060088 A1* | 3/2009 | Callard et al. | 375/299 |
| 2009/0303978 A1* | 12/2009 | Pajukoski et al. | 370/345 |
| 2010/0208679 A1* | 8/2010 | Papasakellariou et al. | 370/329 |

(Continued)

FOREIGN PATENT DOCUMENTS

CN 101267239 A 9/2008
CN 101399647 A 4/2009
(Continued)

OTHER PUBLICATIONS

Catt et al., "CRC mask for DCI format 1A in transmission mode 7 configured by C-RNTI", 3GPP Draft, R1-090182, 3rd Generation Partnership Project (3GPP), Mobile Competence Centre , 650, Route Des Lucioles , F-06921 Sophia-Antipolis Cedex , France, no. Ljubljana, Jan. 8, 2009, Jan. 8, 2009 (Jan. 8, 2009), XP050318115.
(Continued)

*Primary Examiner* — Iqbal Zaidi
(74) *Attorney, Agent, or Firm* — Liem T. Do

(57) ABSTRACT

Certain aspects of the present disclosure relate to techniques for control channel resource mapping with transmit diversity. In an aspect, a method for wireless communications is provided with includes transmitting a signal associated with a downlink control channel, where the downlink control channel spans at least one group of resource elements (REs), and the group of REs indicates a first orthogonal resource to be used by a user equipment (UE). The method also includes signaling a second orthogonal resource to be used by the UE.

36 Claims, 10 Drawing Sheets

(56) References Cited

U.S. PATENT DOCUMENTS

2010/0279628 A1* 11/2010 Love et al. .................. 455/70
2011/0274071 A1* 11/2011 Lee et al. .................... 370/329
2012/0008577 A1* 1/2012 Han et al. ................... 370/329

FOREIGN PATENT DOCUMENTS

| | | | |
|---|---|---|---|
| CN | 101478808 A | 7/2009 | |
| EP | 1355434 A1 | 10/2003 | |
| JP | 2000013292 A | 1/2000 | |
| JP | 2006279197 A | 10/2006 | |
| JP | WO 2008083804 A2 * | 7/2008 | ........... H04L 1/0017 |
| JP | 2011530941 A | 12/2011 | |
| WO | WO-2008079455 A1 | 7/2008 | |
| WO | WO2008083804 * | 7/2008 | |
| WO | WO2008092160 | 7/2008 | |
| WO | WO2008083804 * | 8/2008 | ........... H04W 40/00 |
| WO | WO-2008156389 A1 | 12/2008 | |
| WO | WO-2010018977 A2 | 2/2010 | |

OTHER PUBLICATIONS

Huawei: "ACK/NACK repetition in E-UTRA uplink" 3GPP Draft; R1-080121, 3rd Generation Partnership Project (3GPP), Mobile Competence Centre ; 650, Route Des Lucioles ; F-06921 Sophia-Antipolis Cedex; France, vol. RAN WG1, no. Sevilla, Spain; Jan. 8, 2008, Jan. 8, 2008 (Jan. 8, 2008), XP050108652.

Huawei: "Transmit diversity scheme for PUCCH in LTE-A", 3GPP Draft; R1-091280 Huawei Transmit Diversity Schemes for PUCCH in LTE-A, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, Mar. 17, 2009 (Mar. 17, 2009), XP050338888, [retrieved on Mar. 17, 2009].
International Search Report and Written Opinion—PCT/US2010/043843, International Search Authority—European Patent Office—Feb. 14, 2011.
Partial International Search Report—PCT/US2010/043843—International Search Authority, European Patent Office, Dec. 14, 2010.
Research in Motion et al., "Transmission Mode Configuration for LTE-A Uplink Transmission", 3GPP Draft, RI-094108(Rim-Trans Mode Config LTE-A), 3rd Generation Partnership Project (3GPP), Mobile Competence Centre , 650, Route Des Lucioles , F-06921 Sophia-Antipolis Cedex , France, no. Miyazaki, Oct. 12, 2009, Oct. 12, 2009 (Oct. 12, 2009), XP050388581.
Qualcomm Europe: "PUCCH Transmit Diversity", 3GPP Draft; R1-092711 PUCCH TX Diversity, 3rd Generation Partnership Project (3GPP), Mobile Competence Centre ; 650, Route Des Lucioles; F-06921 Sophia-Antipolis Cedex ; France, no. Los Angeles, USA; Jun. 24, 2009, Jun. 24, 2009 (Jun. 24, 2009), XP050351182, [retrieved on Jun. 24, 2009] paragraph [02.2].
Sharp, "Payload increase for LTE-A PUCCH format 2 achieved by Transmit Diversity", R1-092341, 3GPP RAN WG1 #57bis meeting (Jun. 29, 2009).
Taiwan Search Report—TW099125495—TIPO—May 31, 2013.

\* cited by examiner

PHYSICAL UPLINK CONTROL CHANNEL (PUCCH) RESOURCE MAPPING WITH TRANSMIT DIVERSITY

CLAIM OF PRIORITY UNDER 35 U.S.C. §119

This present Application for patent claims the benefit of U.S. Provisional Patent Application No. 61/230,666, entitled, "Physical Uplink Control Channel (PUCCH) Resource Mapping with Transmit Diversity," filed Jul. 31, 2009, and assigned to the assignee hereof and hereby expressly incorporated by reference herein.

BACKGROUND

Field

Certain aspects of the present disclosure generally relate to wireless communications and, more particularly, to a method for control channel resource mapping with transmit diversity.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes transmitting a signal associated with a downlink control channel, wherein the downlink control channel spans at least one group of resource elements (REs), wherein the group of REs indicates a first orthogonal resource to be used by a user equipment (UE), and signaling a second orthogonal resource to be used by the UE.

Certain aspects of the present disclosure provide an apparatus for wireless communications. The apparatus generally includes means for transmitting a signal associated with a downlink control channel, wherein the downlink control channel spans at least one group of resource elements (REs), wherein the group of REs indicates a first orthogonal resource to be used by a user equipment (UE), and means for signaling a second orthogonal resource to be used by the UE.

Certain aspects of the present disclosure provide an apparatus for wireless communications. The apparatus generally includes a transmitter configured to transmit a signal associated with a downlink control channel, wherein the downlink control channel spans at least one group of resource elements (REs), wherein the group of REs indicates a first orthogonal resource to be used by a user equipment (UE), and a circuit configured to signal a second orthogonal resource to be used by the UE.

Certain aspects of the present disclosure provide a computer-program product for wireless communications comprising a computer readable medium having instructions stored thereon, the instructions being executable by one or more processors. The instructions generally include instructions for transmitting a signal associated with a downlink control channel, wherein the downlink control channel spans at least one group of resource elements (REs), wherein the group of REs indicates a first orthogonal resource to be used by a user equipment (UE), and instructions for signaling a second orthogonal resource to be used by the UE.

Certain aspects of the present disclosure provide an apparatus for wireless communications. The apparatus generally includes at least one processor configured to transmit a signal associated with a downlink control channel, wherein the downlink control channel spans at least one group of resource elements (REs), wherein the group of REs indicates a first orthogonal resource to be used by the UE, and signal a second orthogonal resource to be used by a user equipment (UE), and a memory coupled to the at least one processor.

Certain aspects of the present disclosure provide a method for wireless communications. The method generally includes receiving a signal associated with a downlink control channel, wherein the downlink control channel spans at least one group of resource elements (REs) used for control signaling, and determining, based at least in part on the group of REs, at least two orthogonal resources to use for transmit diversity from at least two antennas.

Certain aspects of the present disclosure provide an apparatus for wireless communications. The apparatus generally includes means for receiving a signal associated with a downlink control channel, wherein the downlink control channel spans at least one group of resource elements (REs) used for control signaling, and means for determining, based at least in part on the group of REs, at least two orthogonal resources to use for transmit diversity from at least two antennas Certain aspects of the present disclosure provide an apparatus for wireless communications. The apparatus generally includes a receiver configured to receive a signal associated with a downlink control channel, wherein the downlink control channel spans at least one group of resource elements (REs) used for control signaling, and a circuit configured to determine, based at least in part on the group of REs, at least two orthogonal resources to use for transmit diversity from at least two antennas.

Certain aspects of the present disclosure provide a computer-program product for wireless communications comprising a computer readable medium having instructions stored thereon, the instructions being executable by one or more processors. The instructions generally include instructions for transmitting, to a user equipment (UE), a signal associated with a downlink control channel, wherein the downlink control channel spans at least one group of resource elements (REs), wherein the group of REs indicates a first orthogonal resource to be used by the UE, and instructions for signaling a second orthogonal resource to be used by the UE.

Certain aspects of the present disclosure provide an apparatus for wireless communications. The apparatus generally includes at least one processor configured to receive a signal associated with a downlink control channel, wherein the downlink control channel spans at least one group of resource elements (REs) used for control signaling, and determine, based at least in part on the group of REs, at least two orthogonal resources to use for transmit diversity from at least two antennas, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
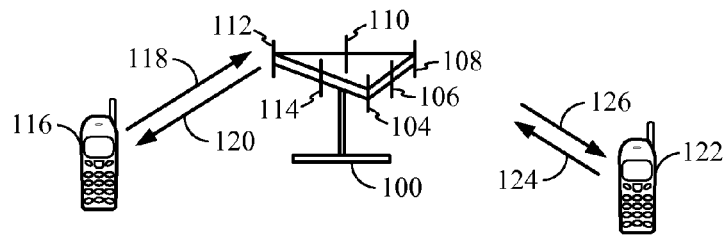
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. SC-FDMA has similar performance and essentially the same overall complexity as those of OFDMA system. However, SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), evolved NodeB ("eNodeB" or "eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
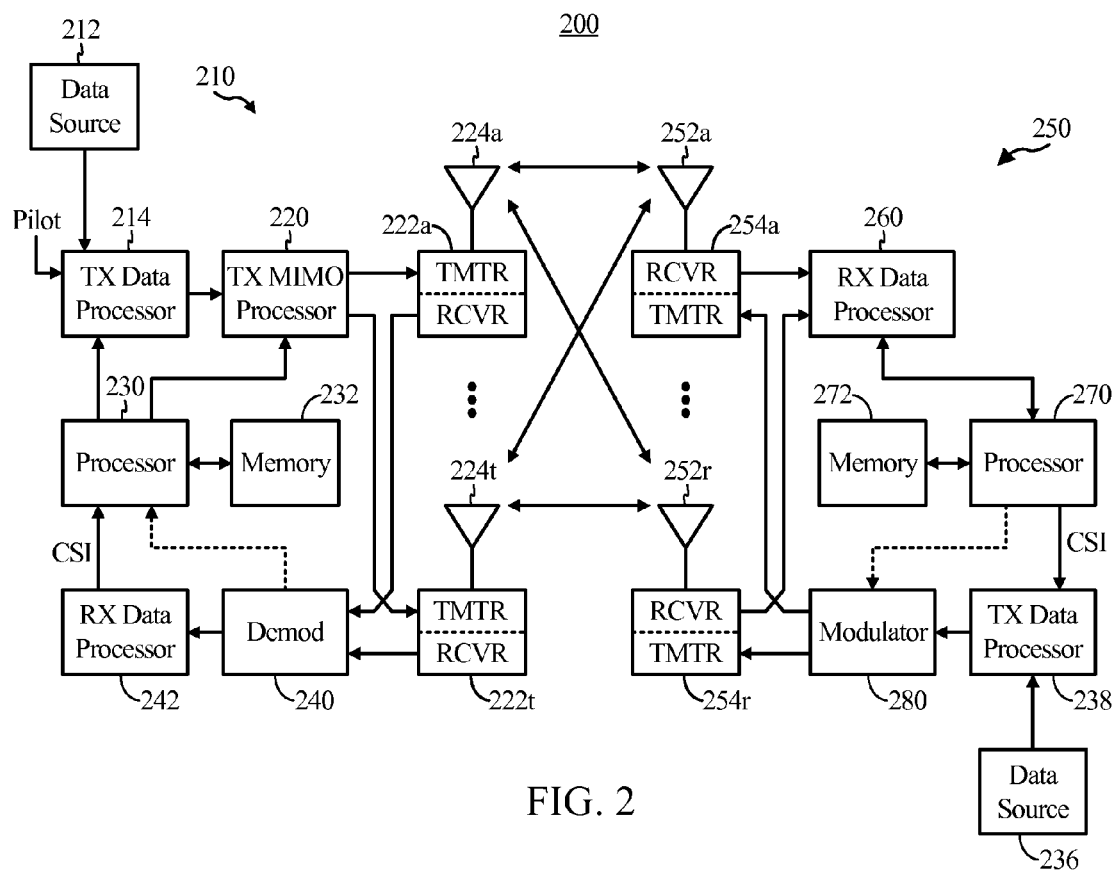
FIG. 2 illustrates a block diagram of an access point and a user terminal in accordance with certain aspects of the present disclosure.

FIG. 2 illustrates a block diagram of an aspect of a transmitter system 210 (e.g., an access point) and a receiver system 250 (e.g., an access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into downlink (DL) and uplink (UL) channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels.

The DL PHY channels comprise: Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH). The UL PHY Channels comprise: Physical Random Access Channel (PRACH), Physical Uplink Shared Channel (PUSCH), and Physical Uplink Control Channel (PUCCH).

In an aspect, a channel structure is provided that preserves low PAPR (at any given time, the channel is contiguous or uniformly spaced in frequency) properties of a single carrier waveform.

PUCCH Resource Mapping with Transmit Diversity

Figure 3:
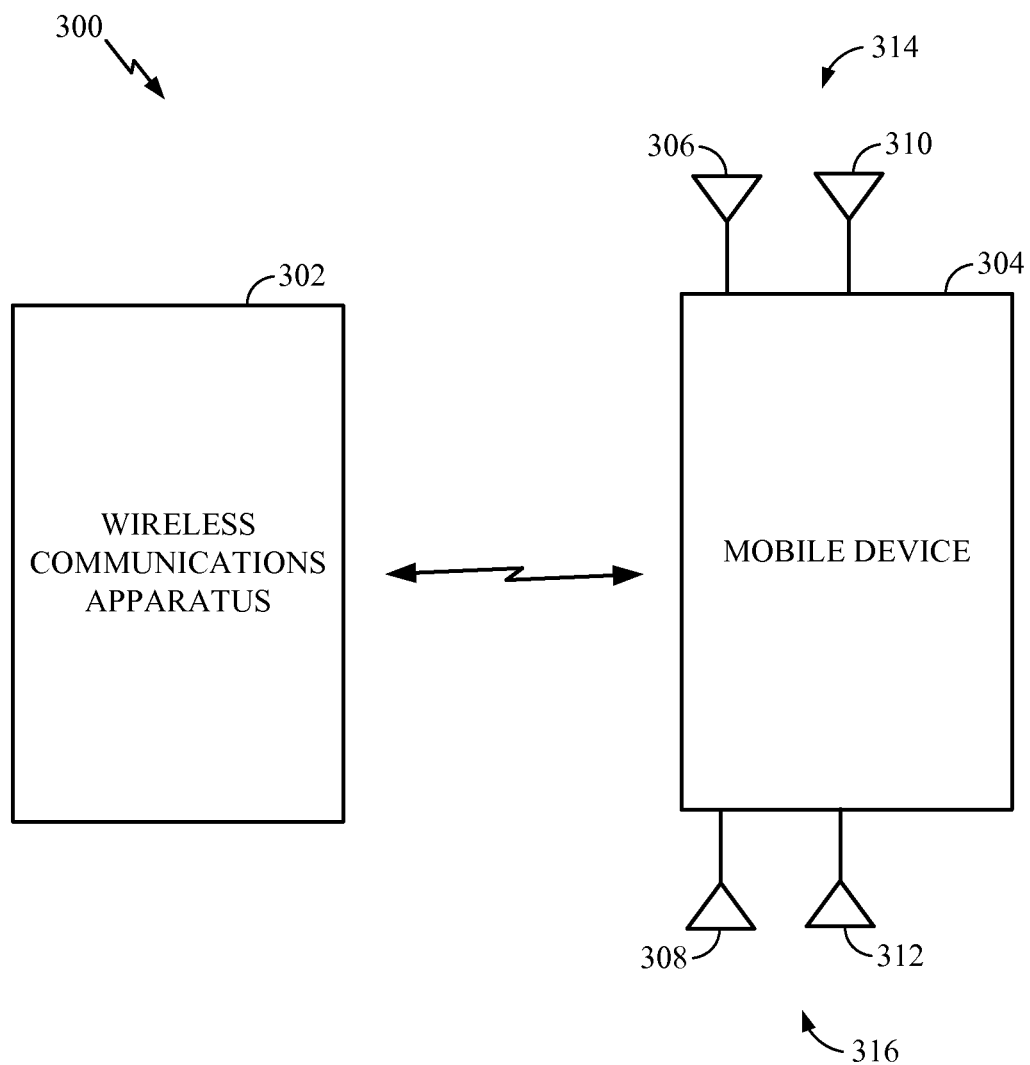
FIG. 3 illustrates a system for Physical Uplink Control Channel (PUCCH) resource mapping with transmit diversity in accordance with certain aspects of the present disclosure.

With reference to FIG. 3, illustrated is a system 300 for Physical Uplink Control Channel (PUCCH) resource mapping with transmit diversity, according to an aspect. The system 300 may comprise a wireless communications apparatus 302, which may be a base station (e.g., the eNodeB 100 of FIG. 1), and which may communicate with at least one mobile device 304 (e.g., at least one of the mobile devices 116 and 122 of FIG. 1). It should be understood that although only one wireless communications apparatus 302 and one mobile device 304 are illustrated, the system 300 may comprise more than one wireless communications apparatus and/or more than one mobile device.

The mobile device 304 may be a multi-transmit (multi-Tx) mobile device that comprises one or more transmit antennas, wherein a first transmit antenna 306 and a second transmit antenna 308 are illustrated. The mobile device 304 may be configured to perform transmit diversity by utilizing the first transmit antenna 306 and the second transmit antenna 308. However, in accordance with some aspects, the mobile device 304 may be configured not to perform transmit diversity. For example, the mobile device may be configured to perform uplink (UL) transmission specified by the 3$^{rd}$ Generation Partnership Project Long Term Evolution (3GPP-LTE) Release-8 wireless standard (or simply "Rel-8"), or it may be backward compatible. In accordance with these aspects, only a single antenna of the mobile device 304 may be utilized for communication. An UL transmission is a transmission link from the mobile device 304 to the wireless communications apparatus 302, and a downlink (DL) transmission is a transmission link from the wireless communications apparatus 302 to the mobile device 304.

Each transmit antenna (e.g., the first transmit antenna 306 and the second transmit antenna 308) may be provided with an orthogonal resource (if transmit diversity is utilized). For example, the first transmit antenna 306 may be provided with a first orthogonal resource and the second transmit antenna 308 may be provided with a second orthogonal resource (e.g., multiple-resource PUCCH for two transmit antennas). Although each transmit antenna 306, 308 may utilize a different orthogonal resource, both transmit antennas 306, 308 may transmit the same information.

In accordance with some aspects, Rel-8 PUCCH formats may include PUCCH format 1a/1b. A single-carrier system may be employed with LTE (i.e., LTE Rel-8, referred to as legacy system) and a multiple-carrier system may be employed with Long Term Evolution Advanced (LTE-A) (i.e., LTE Rel-9/Rel-10). However, it should be understood that the disclosed aspects are not limited to these types of communications systems and may be employed with other communications systems. In an example, Spatial Orthogonal-Resource Transmit Diversity (SORTD) may be applied, where the same modulated symbol d(0) may be transmitted on different orthogonal resources for different antennas. In accordance with some aspects, Rel-8 PUCCH formats may also include PUCCH format 2/2a/2b.

According to some aspects, the mobile device 304 may comprise a third transmit antenna 310 and at least a fourth transmit antenna 312 (e.g., multiple-resource PUCCH for four transmit antennas). For UL PUCCH, the mobile device 304 may group sets of transmit antennas so that there may be only two groups of antennas. For example, the first transmit antenna 306 and the third transmit antenna 310 may be grouped together to form a group 314, and the second transmit antenna 308 and the fourth transmit antenna 312 may be grouped together to form a group 316. Each antenna in the group 314 may utilize the same orthogonal resource and each antenna in the group 316 may utilize the same orthogonal resource, which may be a different orthogonal resource than the orthogonal resource utilized by the group 314. Thus, two transmit antenna transmit diversity (TxD) with antenna virtualization may be applied. The antenna virtualization may be transparent to the wireless communications apparatus 302 (e.g., eNB or base station). It should be understood that although the antennas in each group are illustrated as located near each other, the various antennas may be operatively connected to the mobile device 304 at any location.

The following relates to PUCCH resource mapping in Rel-8. In Rel-8, there is only one transmit antenna active in a subframe. Thus, only one orthogonal resource may be utilized per mobile device 304. An orthogonal resource may be mapped to a first control channel element (CCE) of a signal associated with Physical Downlink Control Channel (PDCCH) (e.g., a DL grant). The DL grant may be numbered so that the PDCCH may represent the DL assignment message and it may comprise a CCE index. Thus, for example, an orthogonal resource employed for an UL ACK (Acknowledgement) transmission from the mobile device 304 may be indicated by the PDDCH, wherein the indication may be a function of the first CCE index of the DL grant.

In accordance with some aspects, data may be transmitted to the mobile device 304. However, there may not be any DL grant, which is referred to as semi-persistent scheduling (SPS) or Scheduling Request (SR). In this case, an UL orthogonal resource may be signaled through Layer 3 (L3) signaling. In the SPS, the orthogonal resource assigned may be utilized until a next orthogonal resource is assigned, which may be, in accordance with some aspects, about every 100 milliseconds. For L3 signaling, the wireless communications apparatus 302 (e.g., eNB) may explicitly signal to the mobile device 304 one or more orthogonal resources to be utilized for PUCCH transmission.

In accordance with some aspects, the PUCCH resource index may be a function of the DL assignment index. The mobile device 304 may use PUCCH resources $n_{PUCCH}^{(1)}$ for transmission of HARQ-ACK (Hybrid ARQ Acknowledgement) in a subframe, where for a Physical Downlink Shared Channel (PDSCH) transmission, indicated by detecting a corresponding PDCCH in a subframe n−4, or for a PDCCH indicating downlink SPS release in the subframe n−4, the mobile device may use $n_{PUCCH}^{(1)}=n_{CCE}+N_{PUCCH}^{(1)}$ resource, where $n_{CCE}$ is a number of the first CCE used for transmission of the corresponding Downlink Control Information (DCI) assignment, and $N_{PUCCH}^{(1)}$ may be configured by higher layers. For a PDSCH transmission where a corresponding PDCCH may not be detected in the subframe n−4, the value of $n_{PUCCH}^{(1)}$ may be determined according to higher layer configuration.

Figure 4:
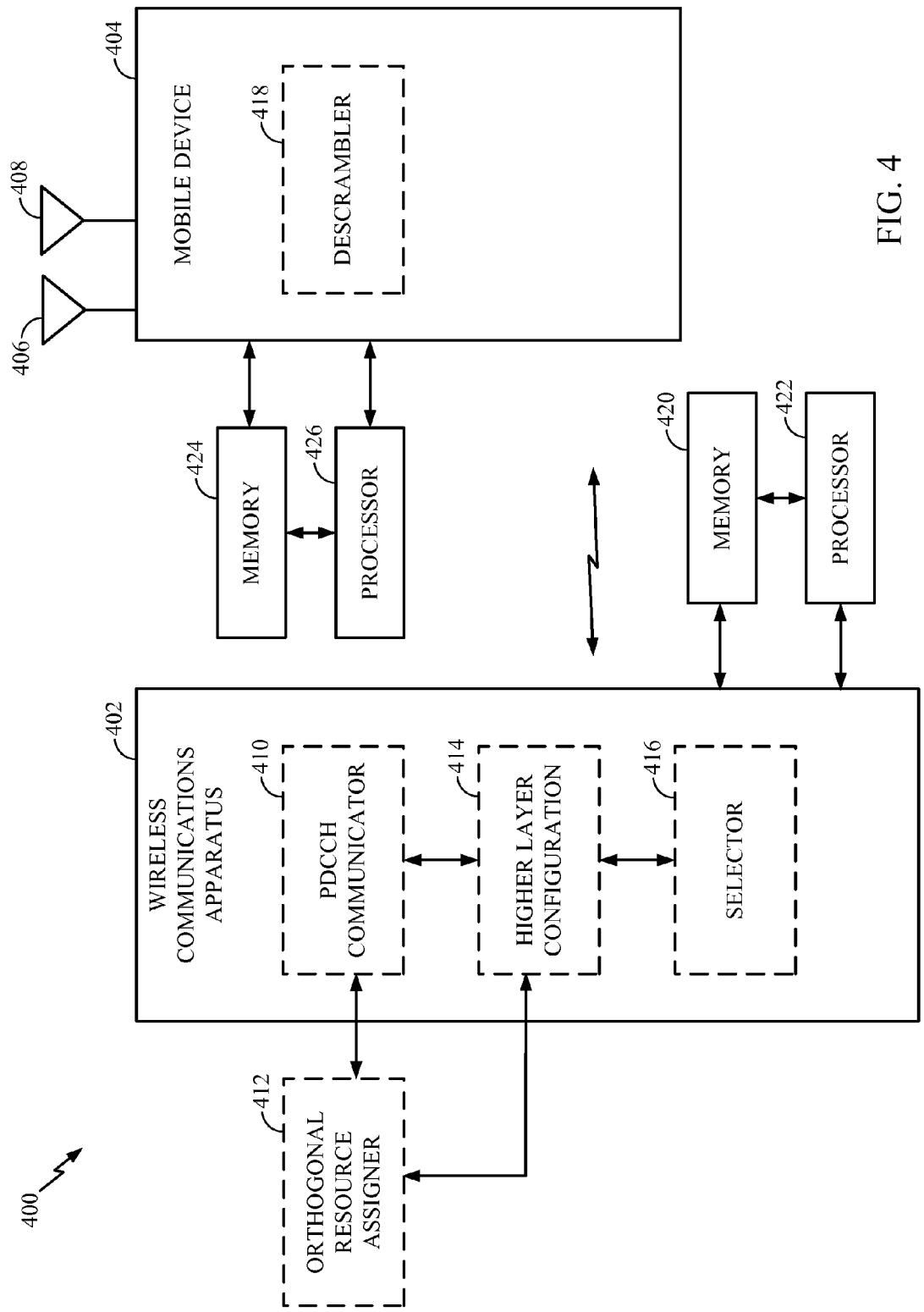
FIG. 4 illustrates another system for PUCCH resource mapping with transmit diversity in accordance with certain aspects of the present disclosure.

FIG. 4 illustrates another system 400 for PUCCH resource mapping with transmit diversity according to an aspect. The system 400 may comprise a wireless communications apparatus 402 that may be a base station (e.g., eNB) and at least one mobile device 404 with two or more transmit antennas 406, 408.

For PUCCH resource mapping for format 1a/1b, with applied SORTD, multiple orthogonal resources may be required since each of the transmit antennas 406-408 may be assigned with one orthogonal resource. If PDCCH (e.g., DL grant) is present and the PDCCH spans more than one CCE, then at least two different solutions may be applied. In one aspect, each CCE may map to a different orthogonal resource (e.g., each CCE may comprise a mapping index) and, therefore, multiple orthogonal resources may be determined at the mobile device 404.

In another aspect, the first orthogonal resource may be mapped to a first CCE of the PDCCH, and this resource may be derived at the mobile device according to the Rel-8 specification. Remaining orthogonal resources may be determined by higher layer configuration. Thus, the wireless communications apparatus 402 may comprise a PDCCH communicator 410 that may be configured to transmit to a mobile device 404 a signal associated with PDCCH. An orthogonal resource assigner 412 of the wireless communications apparatus 402 may map a first orthogonal resource to the first CCE of the PDCCH. The orthogonal resource assigner 412 may also map the remaining orthogonal resources as determined by higher layer configuration 414.

In an aspect, different PUCCH resources on different transmitters may occupy the same Resource Block (RB) within a subframe to enhance channel estimation at the wireless communications apparatus 402. For example, in a first time slot, the first transmit antenna 406 may utilize RB0 and the second transmit antenna 408 may utilize RB49. In a second time slot, the first transmit antenna 406 may use RB49 and the second transmit antenna 408 may use RB0 with mirror hopping.

In an exemplary case, two orthogonal resources may be required for the two transmit antennas 406, 408, a first orthogonal resource may be defined by resource index 0, which may be mapped to the first CCE on the DL grant. A second orthogonal resource, when required, may be defined by higher layer configuration, semi-statically. Thus, the resource links to PDCCH (e.g., DL grant) may be more dynamic than the resource defined by higher layer configuration. Further, the antenna that should be utilized for each resource may be known to both the wireless communications apparatus 402 and the mobile device 404 so that the wireless communications apparatus 402 may decode UL from the mobile device 404. It should be understood that the first orthogonal resource may be defined by higher layer configuration, and the second orthogonal resource may be defined by PDCCH.

In accordance with some aspects, if PDCCH is present and the PDCCH spans only one CCE, then a first orthogonal resource may be mapped to the first CCE of PDCCH, while remaining orthogonal resources may be determined by higher layer configuration. Or, in accordance with some aspects, a first orthogonal resource may be determined by higher layer configuration, and a second orthogonal resource may be mapped to the first CCE of PDCCH.

In accordance with some aspects, for semi-persistent scheduling (SPS), PDCCH may not be present. In this situation, multiple orthogonal resources may be determined by the higher layer configuration 414.

In accordance with some aspects, the wireless communications apparatus 402 (e.g., eNB) may be flexible enough to turn "on" or to turn "off" the PUCCH transmit diversity. For example, there may be situations when the mobile device 404 does not need to utilize transmit diversity (e.g., the mobile device 404 may have a high transmit power). In this situation, transmit diversity may be turned "off" to conserve resources (e.g., at least two orthogonal resources may be utilized for achieving transmit diversity, which may require additional overhead). Thus, the wireless communications apparatus 402 may comprise a selector 416 configured to selectively turn "on" or "off" transmit diversity. There are at least four different options that may be utilized by the selector 416 to turn off transmit diversity.

In one aspect, a PDCCH format may be utilized that spans only one CCE. When the mobile device 404 receives the PDCCH format that spans a single CCE, the mobile device 404 may be aware that only one transmit antenna should be utilized (e.g., only one orthogonal resource may be utilized). In another aspect, the higher layer configuration 414 may instruct the mobile device 404 to only use one transmit antenna.

In yet another aspect, the selector 416 may place a single bit in a DL assignment message (e.g., a PDCCH payload) to indicate whether transmit diversity is "on" or "off." In this case, a status of transmit diversity may be explicitly indicated.

In yet another aspect, the selector 416 may be applying cyclic redundancy check (CRC) masking or a scrambling code on the DL assignment message to indicate whether transmit diversity is on or off. The mobile device 404 may comprise a descrambler 418 configured to decode scrambling applied on the DL assignment and/or to perform CRC de-masking. For example, the wireless communications apparatus 402 may utilize a first scrambling code to indicate that transmit diversity is off, while a second scrambling code may be used to indicate that transmit diversity is on (or vice versa). In this case, the descrambler 418 may be required to decode the DL assignment twice, once with the first scrambling code and then with the second scrambling code. Depending on which scrambling code correctly decodes the DL assignment, it may be determined whether transmit diversity is on or off. In a similar manner, a first CRC masking may indicate that transmit diversity is on, and a second CRC masking may indicate that transmit diversity is off (or vice versa).

In accordance with some aspects, PUCCH resource mapping with transmit diversity may be enabled for format 1 (i.e., scheduling request), format 2 (i.e., Channel Quality Indicator (CQI)), format 2a (i.e., CQI+1 bit Acknowledgement (ACK)), and/or format 2b (i.e., CQI+2 bit ACK). In this aspect, multiple orthogonal resources may be determined by the higher layer configuration 414. Further, the wireless communications apparatus 402 may be configured to turn on/off the PUCCH transmit diversity by not configuring the additional orthogonal resource(s).

The system 400 may comprise a memory 420 operatively coupled to the wireless communications apparatus 402. The memory 420 may be external to the wireless communications apparatus 402 or may reside within the wireless communications apparatus 402. The memory 420 may store instructions related to transmitting a signal associated with a downlink control channel (e.g., a PDCCH). The downlink control channel may span at least one group of resource elements (REs), wherein the group of REs may comprise one CCE. The memory 420 may further store instructions related to mapping a first orthogonal resource to a first CCE of the PDCCH and signaling, to a mobile device, at least a second orthogonal resource to be used by the mobile device. In accordance with some aspects, the memory 420 may retain further instructions related to turning off transmit diversity by using a PDCCH format that spans only one CCE. In accordance with another aspect, the memory 420 may retain further instructions related to activating a single bit in a downlink assignment to indicate that transmit diversity is on or deactivating the bit to indicate that the transmit diversity is off. According to yet another aspect, the memory 420 may retain further instructions related to utilizing CRC masking or scrambling on a downlink assignment to indicate a status of transmit diversity.

At least one processor 422 may be operatively connected to the wireless communications apparatus 402 (and/or the memory 420) to facilitate analysis of information related to resource mapping in a communication network. The processor 422 may be a processor dedicated to analyzing and/or generating information received by the wireless communications apparatus 402, a processor that may control one or more components of the system 400, and/or a processor that may be able to both analyze and generate information received by the mobile device 404 and control one or more components of the system 400.

In accordance with some aspects, the processor 422 may be configured to perform PUCCH resource mapping with transmit diversity. The processor 422 may comprise a first module for transmitting a signal associated with a downlink control channel (e.g., a PDCCH), wherein the downlink control channel may span at least one group of REs. The group of REs may comprise, for example, one CCE of the PDCCH. The processor 422 may also comprise a second module for indicating a first orthogonal resource by using a first CCE of the PDCCH. Further, the processor 422 may comprise a third module for signaling a second orthogonal resource to be used by the mobile device, and a fourth module for changing a status of the transmit diversity. In addition, the processor 422 may comprise a fourth module for receiving another signal associated with an uplink control channel (e.g., a PUCCH), wherein the other signal may be transmitted by the mobile device 404 using the first and second orthogonal resources for achieving transmit diversity at the mobile device.

Further, the system 400 may comprise a memory 424 operatively coupled to the mobile device 404. The memory 424 may be external to the mobile device 404 or may reside within the mobile device 404. The memory 424 may store instructions related to receiving a signal associated with a downlink control channel (e.g., a PDCCH), wherein the downlink control channel may span at least one group of REs used for control signaling. The group of REs may comprise, for example, one CCE of the PDCCH. The memory 424 may also store instructions related to determining, based at least in part on the group of REs, at least two orthogonal resources to be used by the mobile device 404 for transmit diversity from at least two antennas of the mobile device.

In accordance with some aspects, the memory 424 may retain further instructions related to deriving at least a first orthogonal resource from a first CCE and deriving additional orthogonal resources according to higher layer configuration. According to some aspects, the memory 424 may retain further instructions related to using CRC de-masking or de-scrambling of a downlink assignment to determine whether to use transmit diversity.

At least one processor 426 may be operatively connected to the mobile device 404 (and/or memory 424) to facilitate analysis of information related to resource mapping in a communication network. The processor 426 may be a processor dedicated to analyzing and/or generating information received by the mobile device 404, a processor that may control one or more components of the system 400, and/or a processor that both may analyze and generate information received by the mobile device 404 and control one or more components of the system 400.

In accordance with some aspects, the processor 426 may be configured to determine orthogonal resources. The processor 426 may comprise a first module for receiving a signal associated with a downlink control channel (e.g., a PDCCH), wherein the downlink control channel may span at least one group of REs used for control signaling. The group of REs may comprise, for example, one CCE of the PDCCH. The processor 426 may also comprise a second module for determining, based at least in part on the group of REs, at least two orthogonal resources to be used by the mobile device 404 for transmit diversity from at least two antennas of the mobile device. The processor 426 may also comprise a third module for determining a first orthogonal resource from a first CCE of the PDCCH and a fourth module for determining additional orthogonal resources according to higher layer configuration.

The memory modules 420, 424 may store protocols associated with PUCCH resource mapping with transmit diversity, taking action to control communication between the wireless communications apparatus 402 and the mobile device 404, etc., such that the system 400 may employ the stored protocols and/or algorithms to achieve improved communications in a wireless network as described herein.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
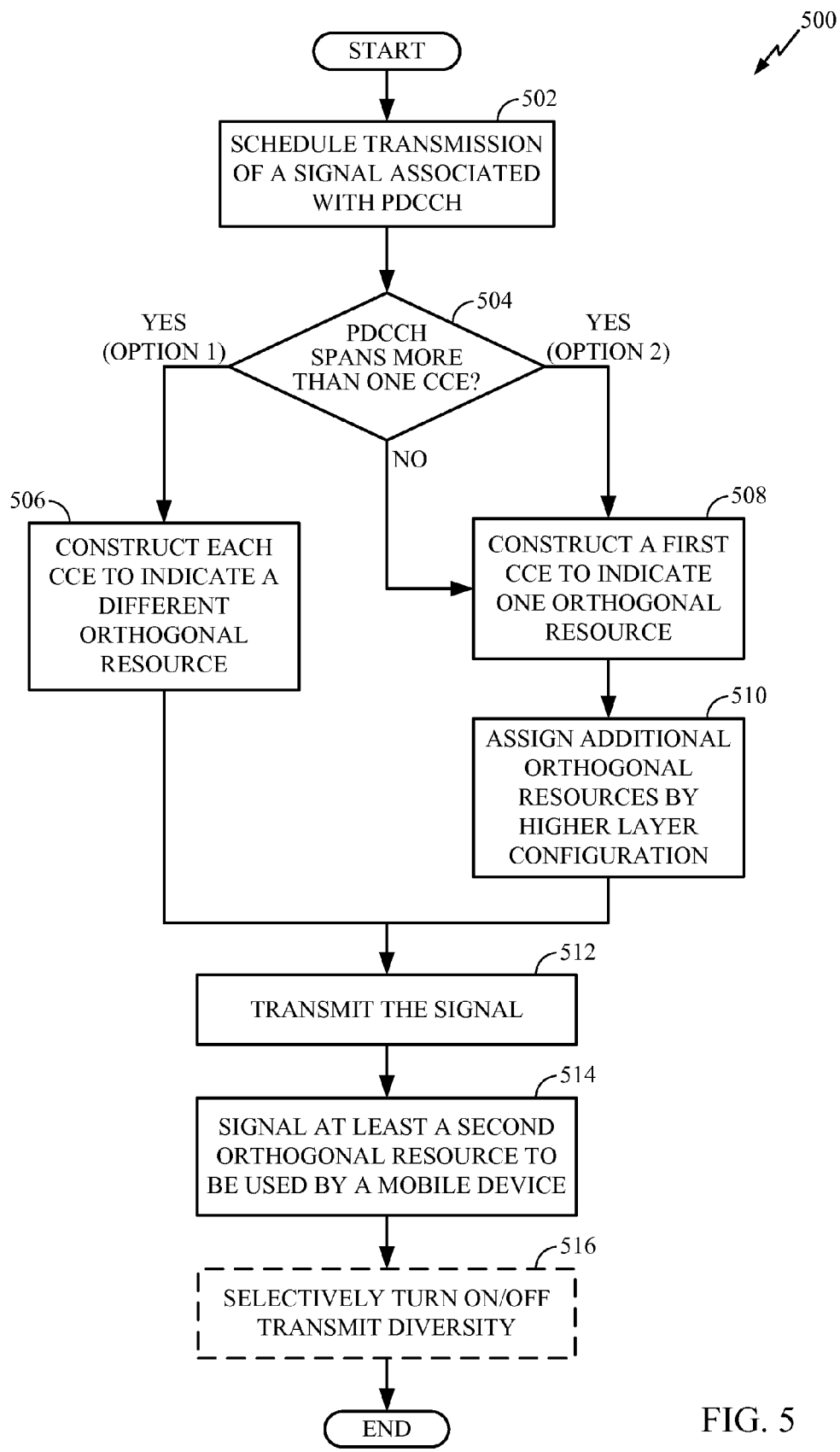
FIG. 5 illustrates a method for PUCCH resource mapping with transmit diversity that may be preformed at an access point in accordance with certain aspects of the present disclosure.

FIG. 5 illustrates a method 500 for PUCCH resource mapping with transmit diversity with format 1a and 1b, in accordance with certain aspects of the present disclosure. The method 500 may be performed, for example, by a base station (e.g., eNB). The method starts, at 502, when transmission of a signal associated with a downlink control channel (e.g., a PDCCH) may be scheduled. At 504, a determination may be made whether the PDCCH spans more than one group of REs, wherein the group of REs may, for example, comprise one CCE of the PDCCH. If the PDCCH spans more than one CCE, there may be at least two options. For option 1, the method 500 continues, at 506, and each group of REs (i.e., each CCE) may be constructed such that to indicate a different orthogonal resource and, therefore, multiple orthogonal resources may be indicated to a mobile device for achieving transmit diversity.

If the determination, at 504, is that PDCCH spans more than one group of REs (i.e., more than one CCE) and option 2 will be utilized and/or if the determination, at 504, is "no," method 500 continues, at 508. At 508, a first group of REs (i.e., a first CCE) of the PDCCH may be constructed such that to indicate one orthogonal resource. Additional orthogonal resources may be assigned, at 510, by higher layer configuration.

At 512, the signal associated with the downlink control channel (e.g., with the PDCCH) may be transmitted to the mobile device, wherein the downlink control channel may span at least one group of REs, wherein the group of REs may indicate a first orthogonal resource to be used by the mobile device. At 514, a second orthogonal resource to be used by the mobile device may be signaled to the mobile device.

In accordance with some aspects, at 516, transmit diversity may be selectively turned on or off. In the case where the mobile device's link budget (e.g., performance) is good, resources may be conserved by turning off transmit diversity. In this case, there may be at least four options for turning on/off the PUCCH transmit diversity, at 516. The first option may be to use a PDCCH format that spans only one CCE. The second option may be to notify the mobile device specifically if transmit diversity is on/off through higher layer configuration. The third option may be to use a single bit in a DL assignment to indicate whether transmit diversity is on or off. The fourth option may be to use CRC masking or scrambling on the DL assignment to indicate if transmit diversity is on or off.

Figure 6:
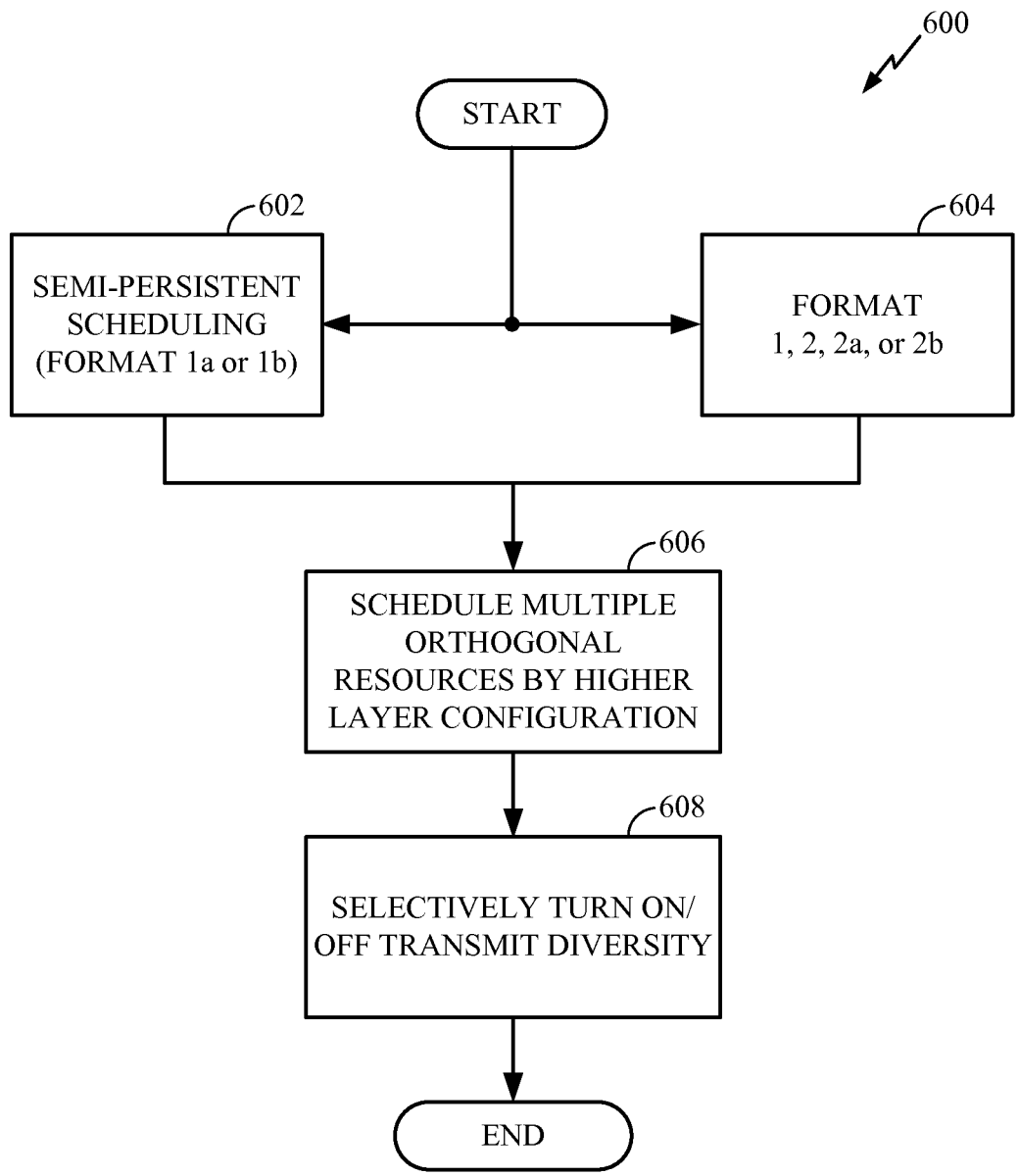
FIG. 6 illustrates another method for PUCCH resource mapping with transmit diversity that may be preformed at the access point in accordance with certain aspects of the present disclosure.

FIG. 6 illustrates a method 600 for PUCCH resource mapping with transmit diversity, in accordance with certain aspects of the present disclosure. For format 1a and 1b, the method 600 starts, at 602, with semi-persistent scheduling. There might not be any PDCCH present in the case of semi-persistent scheduling. For formats 1, 2, 2a, and/or 2b, the method 600 starts at 604. Format 1 is a scheduling request, format 2 is CQI, format 2a is CQI+1 bit ACK and format 2B is CQI+2 bit ACK.

The method 600 continues (from 602 or 604), at 606, and multiple orthogonal resources may be scheduled by higher layer configuration. In accordance with some aspects, transmit diversity may be selectively turned on/off. For format 1a and 1b, transmit diversity may be selectivity turned on/off based on the four options discussed above with reference to FIG. 5. For format 1, 2, 2a, and/or 2b, transmit diversity may be selectively turned on/off, at 608, by eNB when eNB does not configure additional orthogonal resources.

In accordance with some aspects, a computer program product may comprise a computer-readable medium that comprises code for carrying out various aspects of the method 500 and/or the method 600. The computer-readable medium may comprise a first set of codes to transmit, to a mobile device, a signal associated with a downlink control channel (e.g., with a PDCCH), wherein the downlink control channel may span at least one group of REs, wherein the group of REs may indicate a first orthogonal resource to be used by the mobile device. It should be understood that the group of REs may comprise one CCE of the PDCCH. The computer-readable medium may also comprise a second set of codes for causing the computer to signal, to the mobile device, a second orthogonal resource to be used by the mobile device for achieving transmit diversity. Also included may be a third set of codes for causing the computer to change a status (e.g., on or off) of transmit diversity.

Figure 7:
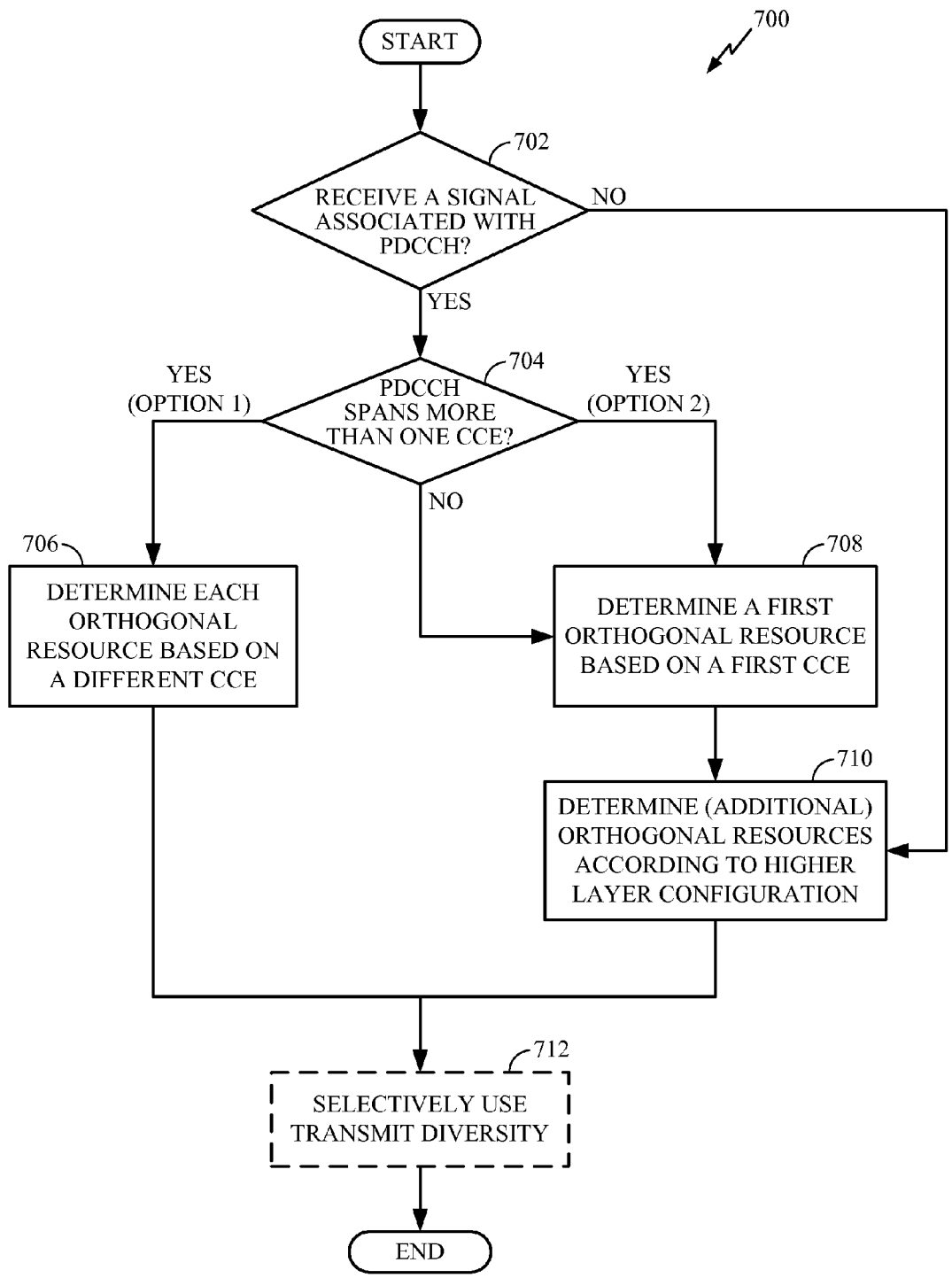
FIG. 7 illustrates a method for PUCCH resource mapping that may be performed at an access terminal in accordance with certain aspects of the present disclosure.

FIG. 7 illustrates a method 700 for PUCCH resource mapping with transmit diversity, according to an aspect. The method 700 may be, for example, performed by a mobile device. The method 700 starts, at 702, with a determination whether a signal associated with a downlink control channel (e.g., with a PDCCH) is received. For example, a PDCCH may not be present for semi-persistent scheduling. If the determination, at 702, is that the signal has been received ("YES"), at 704, a determination may be made whether the PDCCH spans more than one group of REs used for signaling. For example, the group of REs may comprise one CCE of the PDCCH.

If the PDCCH does span more than one group of REs (i.e., more than one CCE) ("YES"), two options may be available. For the first option, at 706, each orthogonal resource may be determined based on a different group of REs (i.e., on a different CCE), and transmit diversity may be applied at the mobile device. For the second option (or if the PDCCH does not span more than one group of REs) ("NO"), at 708, a first orthogonal resource may be determined based on the first group of REs (i.e., on the first CCE). Additional orthogonal resources may be determined, at 710, according to higher layer configuration.

If the determination, at 702, is that the signal associated with the downlink control channel (e.g., with the PDCCH) is not received ("NO"), method 700 continues, at 710, and orthogonal resources may be determined according to higher layer configuration. Further, for format 1 (scheduling request), format 2 (CQI), format 2a (CQI+1 bit ACK) and format 2b (CQI+2 bit ACK), multiple orthogonal resources may be determined by higher layer configuration.

In accordance with some aspects, the method 700 may selectively use transmit diversity, at 712, because an eNB (e.g., a base station) may selectively change the status of transmit diversity (e.g., turn it on or off). For example, if the mobile device has a high transmit power, transmit diversity may not be necessary and may be turned off to conserve resources. The use of transmit diversity, at 712, may be determined when a PDCCH format is received that spans only one CCE. Another option is that transmit diversity is selected as a function of higher layer configuration. A further option is that a single bit in a DL assignment may indicate whether transmit diversity is on or off. In accordance with another option, CRC masking or scrambling on a DL assignment may be utilized to indicate whether transmit diversity is on or off. In this case, the method 700 may need to perform two de-scrambling operations and/or two de-masking operations to determine the status of transmit diversity (e.g., on or off).

In accordance with some aspects, a computer program product may comprise a computer-readable medium that comprises codes for carrying out various aspects of the method 700. The computer-readable medium may comprise a first set of codes for causing a computer to receive a signal associated with a downlink control channel (e.g., with a PDCCH), wherein the downlink control channel may span at least one group of REs used for control signaling. For example, the group of REs may comprise one CCE of the PDCCH. The computer-readable medium may also comprise a second set of codes for causing the computer to determine, based at least in part on the group of REs, at least two orthogonal resources to be used by the mobile device for achieving transmit diversity from at least two antennas of the mobile device.

Figure 8:
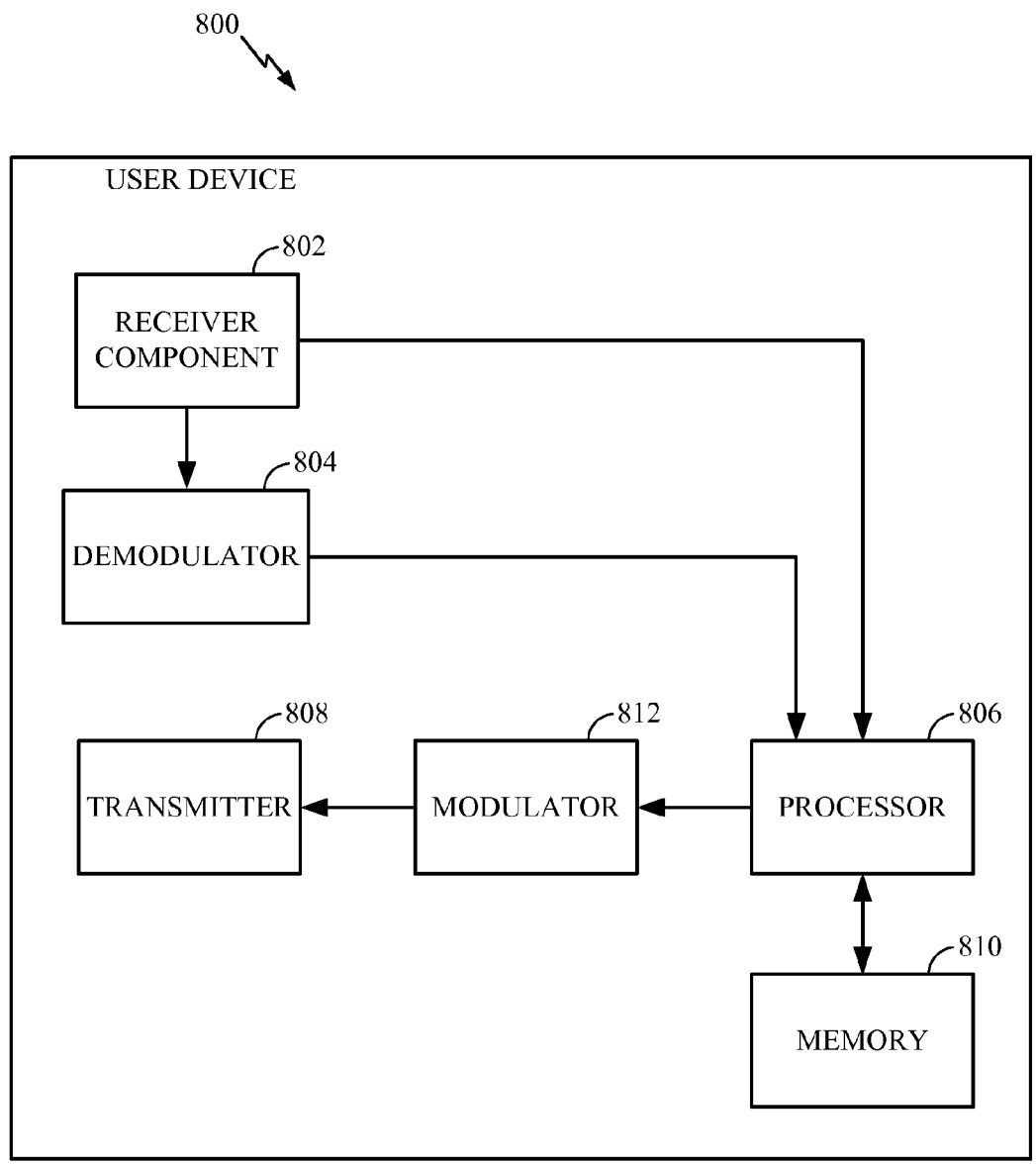
FIG. 8 illustrates a system that facilitates PUCCH resource mapping with transmit diversity in accordance with certain aspects of the present disclosure.

With reference now to FIG. 8, illustrated is a system 800 that facilitates PUCCH resource mapping with transmit diversity in accordance with one or more of the disclosed aspects. The system 800 may reside in a user device. The system 800 may comprise a receiver component 802 that may receive a signal from, for example, a receiver antenna. The receiver component 802 may perform typical actions thereon, such as filtering, amplifying, down-converting, etc., of the received signal. The receiver component 802 may also digitize the conditioned signal to obtain samples. A demodulator 804 may obtain received symbols for each symbol period, as well as provide received symbols to a processor 806.

The processor 806 may be a processor dedicated to analyzing information received by receiver component 802 and/or generating information for transmission by a transmitter 808. In addition or alternatively, the processor 806 may control one or more components of the user device 800, analyze information received by the receiver component 802, generate information for transmission by the transmitter 808 and/or control one or more components of the user device 800. The processor 806 may comprise a controller component capable of coordinating communications with additional user devices.

The user device 800 may additionally comprise a memory 810 operatively coupled to the processor 806. The memory 810 may store information related to coordinating communications and any other suitable information. The memory 810 may additionally store protocols associated with resource mapping. It will be appreciated that data store components (e.g., memories) described herein may be either volatile memory or nonvolatile memory, or may comprise both volatile and nonvolatile memory. By way of illustration, and not limitation, nonvolatile memory may comprise read only memory (ROM), programmable ROM (PROM), electrically programmable ROM (EPROM), electrically erasable ROM (EEPROM), or flash memory. The volatile memory may comprise random access memory (RAM), which may act as external cache memory. By way of illustration and not limitation, RAM may be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the various aspects is intended to comprise, without being limited to, these and any other suitable types of memory. The user device 800 may further comprise a symbol modulator 812, wherein the transmitter 808 may transmit the modulated signal.

Figure 9:
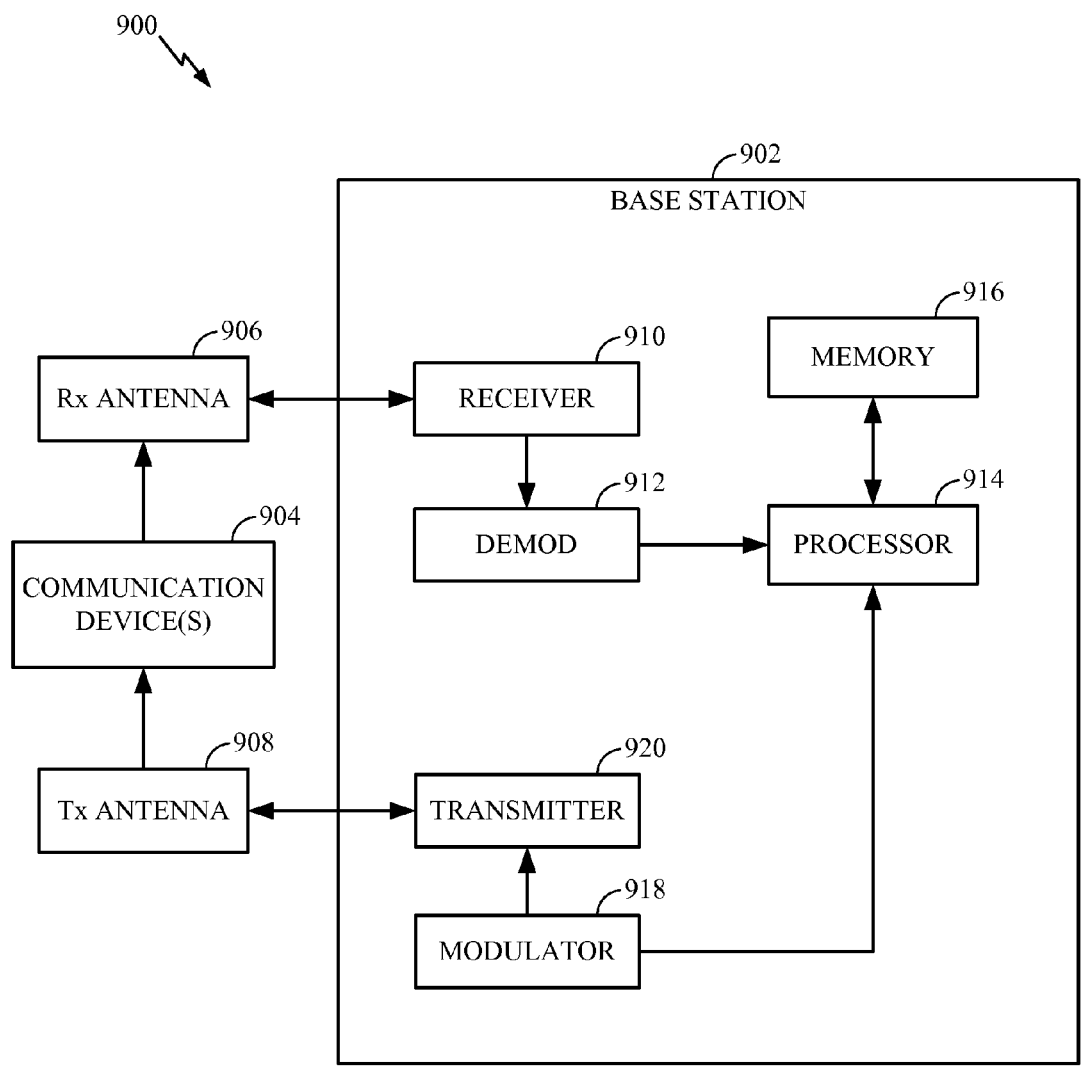
FIG. 9 illustrates another system that facilitates PUCCH resource mapping with transmit diversity in accordance with certain aspects of the present disclosure.

FIG. 9 is an illustration of another system 900 that facilitates PUCCH resource mapping with transmit diversity in accordance with various aspects presented herein. The system 900 may comprise a base station or an access point 902. As illustrated, the base station 902 may receive signal (s) from one or more communication devices 904 (e.g., user device) by a receive antenna 906, and may transmit to the one or more communication devices 904 through a transmit antenna 908.

The base station 902 may comprise a receiver 910 that receives information from the receive antenna 906 and may be operatively associated with a demodulator 912 that may demodulate received information. Demodulated symbols may be analyzed by a processor 914 coupled to a memory 916 that may store information related to resource mapping. A modulator 918 may multiplex the signal for transmission by a transmitter 920 through the transmit antenna 908 to the communication devices 904.

Figure 10:
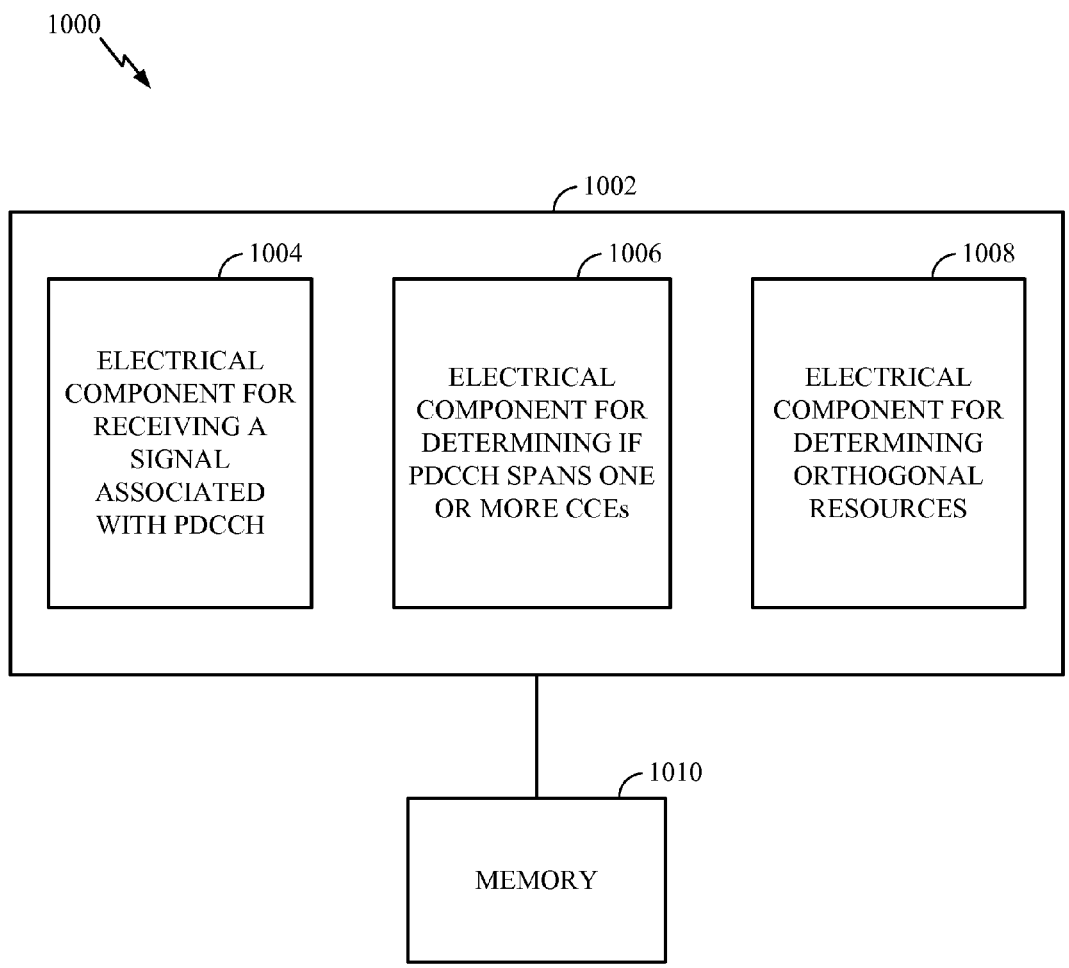
FIG. 10 illustrates an example system that facilitates PUCCH resource mapping with transmit diversity in accordance with certain aspects of the present disclosure.

With reference to FIG. 10, illustrated is an example system 1000 that facilitates PUCCH resource mapping with transmit diversity, according to an aspect. The system 1000 may reside at least partially within a mobile device. It is to be appreciated that the system 1000 is represented as including functional blocks, which may be functional blocks that represent functions implemented by hardware, software, or combination thereof (e.g., firmware).

The system 1000 may comprise a logical grouping 1002 of electrical components that may act separately or in conjunction. The logical grouping 1002 may comprise an electrical component 1004 for receiving a signal associated with a downlink control channel (e.g., with a PDCCH), wherein the downlink control channel may span at least one group of REs used for control signaling. It should be understood that the group of REs may comprise one CCE of the PDCCH. Also included in the logical grouping 1002 is an electrical component 1006 for determining if the PDCCH spans more than one group of REs (i.e., more than one CCE). Further, the logical grouping 1002 may comprise an electrical component 1008 for determining, based at least in part on the group of REs, at least two orthogonal resources to be used by the mobile device for achieving transmit diversity from at least two antennas of the mobile device. In accordance with some aspects, the electrical component 1008 may determine a first orthogonal resource based on a first group of REs (i.e., on a first CCE of the PDCCH), and may determine additional orthogonal resources according to higher layer configuration.

Additionally, the system 1000 may comprise a memory 1010 that retains instructions for executing functions associated with the electrical components 1004, 1006, and 1008 or other components. While illustrated as being external to the memory 1010, it is to be understood that one or more of electrical components 1004, 1006 and 1008 may exist within the memory 1010.

Figure 11:
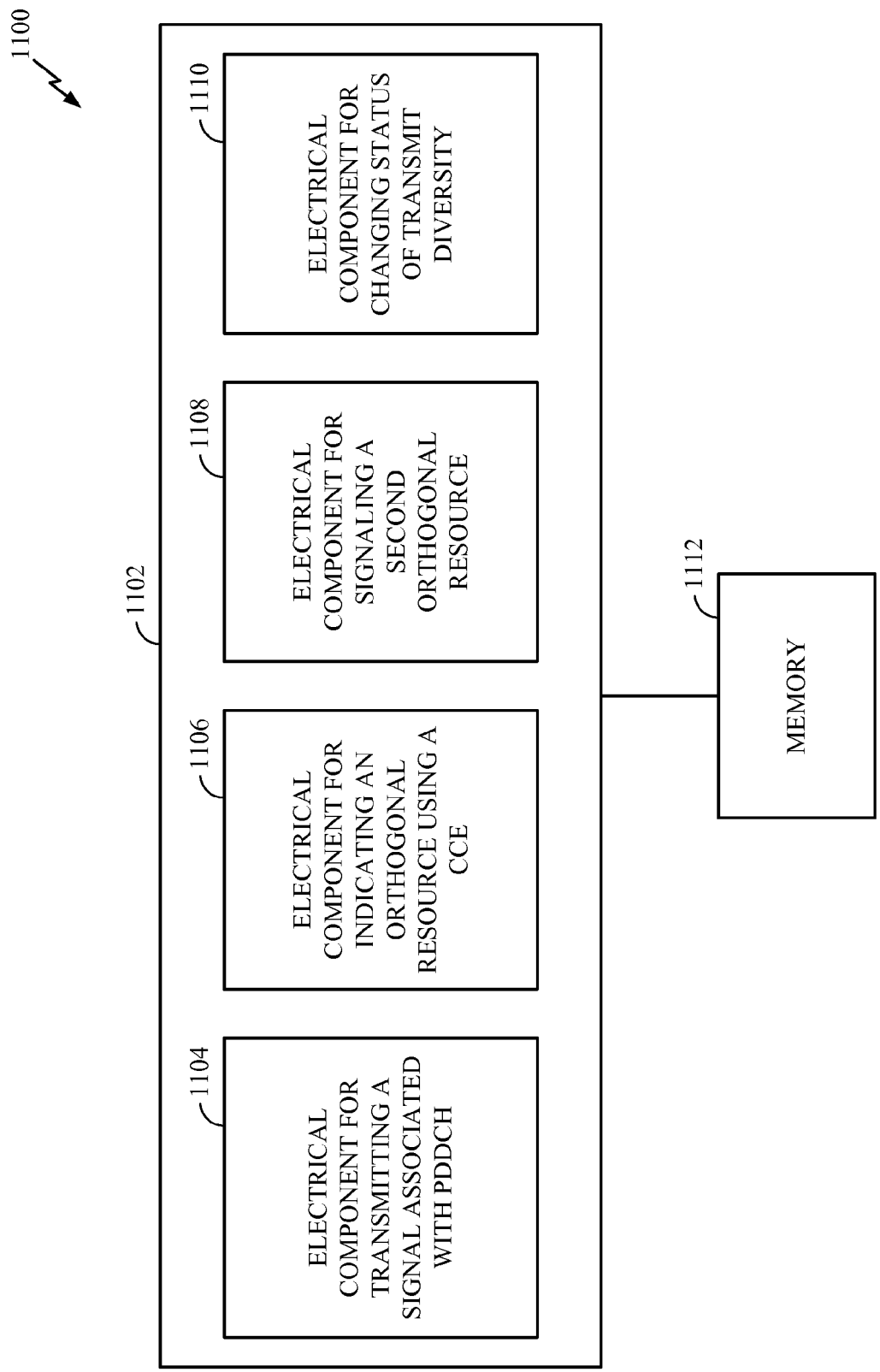
FIG. 11 illustrates another example system that facilitates PUCCH resource mapping with transmit diversity in accordance with certain aspects of the present disclosure.

With reference to FIG. 11, illustrated is an example system 1100 that facilitates PUCCH resource mapping with transmit diversity, according to an aspect. The system 1100 may reside at least partially within a base station. It is to be appreciated that the system 1100 may be represented as including functional blocks, which may be functional blocks that represent functions implemented by a processor, software, or combination thereof (e.g., firmware).

The system 1100 may comprise a logical grouping 1102 of electrical components that may act separately or in conjunction. The logical grouping 1102 may include an electrical component 1104 for transmitting, to a mobile device, a signal associated with a downlink control channel (e.g., with a PDCCH). The downlink control channel may span at least one group of REs. It should be understood that the group of REs may comprise one CCE of the PDCCH. Also included in the logical grouping 1102 may be an electrical component 1106 for indicating a first orthogonal resource using the group of REs (e.g., a first CCE of the PDCCH), and an electrical component 1108 for signaling at least a second orthogonal resource to be used by the mobile device. In accordance with some aspects, the logical grouping 1102 may comprise an electrical component 1110 for selectively changing a status of transmit diversity (e.g., activating or deactivating transmit diversity).

Additionally, the system 1100 may comprise a memory 1112 that retains instructions for executing functions associated with the electrical components 1104, 1106, 1108, and 1110 or other components. While illustrated as being external to a memory 1112, it is to be understood that one or more of electrical components 1104, 1106, 1108 and 1110 may exist within the memory 1112.

In accordance with some aspects, provided is a method used in a wireless communication system. The method may comprise employing a processor executing computer executable instructions stored on a computer readable storage medium to implement the following acts of method. The method may comprise transmitting, to a mobile device, a signal associated with a downlink control channel (e.g., with a PDCCH), wherein the downlink control channel may span at least one group of resource elements (REs), wherein the group of REs may indicates a first orthogonal resource to be used by the mobile device. The group of REs may comprise, for example, one CCE of the PDCCH. The method may also comprise signaling a second orthogonal resource to be used by the mobile device. Additionally, the method may comprise selectively activating or deactivating transmit diversity as a function of performance of the mobile device.

According to an aspect is an apparatus operable in wireless communication system. The apparatus may comprise means for transmitting, to a mobile device, a signal associated with a downlink control channel (e.g., with a PDCCH), wherein the downlink control channel may span at least one group of resource elements (REs), wherein the group of REs may indicate a first orthogonal resource to be used by the mobile device. The group of REs may comprise, for example, one CCE of the PDCCH. The apparatus may also comprise means for signaling a second orthogonal resource to be used by the mobile device. Additionally, the apparatus may comprise means for selectively changing a status of transmit diversity.

In accordance with some aspects, provided is a method used in a wireless communication system. The method may comprise employing a processor executing computer executable instructions stored on a computer readable storage medium to implement the following acts of method. The method may comprise receiving a signal associated with a downlink control channel (e.g., with a PDCCH), wherein the downlink control channel may span at least one group of resource elements (REs) used for control signaling. The group of REs may comprise, for example, one CCE of the PDCCH. The method may also comprise determining, based at least in part on the group of REs, at least two orthogonal resources to be used by a mobile device for transmit diversity from at least two antennas of the mobile device.

According to some aspects, provided is an apparatus operable in wireless communication system. The apparatus may comprise means for receiving a signal associated with a downlink control channel (e.g., with a PDCCH), wherein the downlink control channel may span at least one group of resource elements (REs) used for control signaling. The group of REs may comprise, for example, one CCE of the PDCCH. The apparatus may also comprise means for determining, based at least in part on the group of REs, at least two orthogonal resources to be used by a mobile device for transmit diversity from at least two antennas of the mobile device.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the aspects disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   transmitting a downlink control channel, comprising at least one control channel element (CCE), from a base station to a user equipment (UE) comprising a first antenna and a second antenna for transmitting an acknowledgement (ACK), wherein a first orthogonal resource for transmitting the ACK on a first uplink control channel transmission via the first antenna of the UE is determined based at least in part on a first CCE of the at least one CCE, the first CCE used for transmission of a corresponding downlink control information (DCI) assignment; and
   signaling a higher layer configuration, from the base station to the UE, that indicates a second orthogonal resource to use for transmitting the ACK on a second uplink control channel transmission via the second antenna of the UE, wherein the first orthogonal resource is different from the second orthogonal resource.

2. The method of claim 1, further comprising receiving, from the UE, an uplink control channel signal via the first and second orthogonal resources.

3. The method of claim 1, wherein the downlink control channel is a Physical Downlink Control Channel (PDCCH).

4. The method of claim 1, further comprising signaling to the UE whether to use transmit diversity.

5. The method of claim 4, wherein signaling to the UE whether to use transmit diversity comprises:
   applying a scrambling code on an assignment message transmitted to the UE; or
   applying cyclic redundancy check (CRC) masking on an assignment message transmitted to the UE.

6. The method of claim 4, wherein signaling to the UE whether to use transmit diversity comprises explicitly signaling at least one orthogonal resource to be used by the UE.

7. An apparatus for wireless communications, comprising:
   means for transmitting a downlink control channel, comprising at least one control channel element (CCE), from a base station to a user equipment (UE) comprising a first antenna and a second antenna for transmitting an acknowledgement (ACK), wherein a first orthogonal resource for transmitting the ACK on a first uplink control channel transmission via the first antenna of the UE is determined based at least in part on a first CCE of the at least one CCE, the first CCE used for transmission of a corresponding downlink control information (DCI) assignment; and
   means for signaling a higher layer configuration, from the base station to the UE, that indicates a second orthogonal resource to use for transmitting the ACK on a second uplink control channel transmission via the second antenna of the UE, wherein the first orthogonal resource is a different from the second orthogonal resource.

8. The apparatus of claim 7, further comprising means for receiving, from the UE, an uplink control channel signal via the first and second orthogonal resources.

9. The apparatus of claim 8, further comprising means for signaling to the UE whether to use transmit diversity.

10. The apparatus of claim 9, wherein the means for signaling to the UE whether to use transmit diversity comprises:
    means for applying a scrambling code on an assignment message transmitted to the UE; or
    means for applying cyclic redundancy check (CRC) masking on an assignment message transmitted to the UE.

11. The apparatus of claim 9, wherein the means for signaling to the UE whether to use transmit diversity comprises means for explicitly signaling at least one orthogonal resource to be used by the UE.

12. The apparatus of claim 7, wherein the downlink control channel is a Physical Downlink Control Channel (PDCCH).

13. A base station configured for wireless communications, comprising:
    a memory module; and
    at least one processor coupled to the memory module, the at least one processor configured to:
        transmit a downlink control channel, comprising at least one control channel element (CCE), to a user equipment (UE) comprising a first antenna and a second antenna for transmitting an acknowledgement (ACK), wherein a first orthogonal resource for transmitting the ACK on a first uplink control channel transmission via the first antenna of the UE is determined based at least in part on a first CCE of the at least one CCE, the first CCE used for transmission of a corresponding downlink control information (DCI) assignment; and
        signal a higher layer configuration, from the base station to the UE, that indicates a second orthogonal resource to use for transmitting the ACK on a second uplink control channel transmission via the second antenna of the UE, wherein the first orthogonal resource is different from the second orthogonal resource.

14. The base station of claim 13, wherein the at least one processor is further configured to receive, from the UE, an uplink control channel signal via the first and second orthogonal resources.

15. The base station of claim 13, wherein the downlink control channel is a Physical Downlink Control Channel (PDCCH).

16. The base station of claim 13, wherein the at least one processor is further configured to signal to the UE whether to use transmit diversity.

17. The base station of claim 16, wherein the at least one processor is further configured to:
    apply a scrambling code on an assignment message transmitted to the UE; or
    apply cyclic redundancy check (CRC) masking on an assignment message transmitted to the UE.

18. The base station of claim 16, wherein the at least one processor is further configured to explicitly signal at least one orthogonal resource to be used by the UE.

19. A non-transitory computer-readable medium having non-transitory program code recorded thereon, the program code comprising:
    program code to transmit a downlink control channel, comprising at least one control channel element (CCE), from a base station to a user equipment (UE) comprising a first antenna and a second antenna for transmitting an acknowledgement (ACK), wherein a first orthogonal resource for transmitting the ACK on a first uplink control channel transmission via the first antenna of the UE is determined based at least in part on a first CCE of the at least one CCE, the first CCE used for transmission of a corresponding downlink control information (DCI) assignment; and
    program code to signal a higher layer configuration, from the base station to the UE, that indicates a second orthogonal resource to use for transmitting the ACK on a second uplink control channel transmission via the second antenna of the UE, wherein the first orthogonal resource is different from the second orthogonal resource.

20. The non-transitory computer-readable medium of claim 19, the program code further comprising program code to receive, from the UE, an uplink control channel signal via the first and second orthogonal resources.

21. The non-transitory computer-readable medium of claim 19, wherein the downlink control channel is a Physical Downlink Control Channel (PDCCH).

22. The non-transitory computer-readable medium of claim 19, the program code further comprising program code to signal to the UE whether to use transmit diversity.

23. The non-transitory computer-readable medium of claim 22, wherein the program code to signal comprises:
    program code to apply a scrambling code on an assignment message transmitted to the UE, or
    program code to apply cyclic redundancy check (CRC) masking on an assignment message transmitted to the UE.

24. The non-transitory computer-readable medium of claim 22, wherein the program code to signal comprises program code to explicitly signal at least one orthogonal resource to be used by the UE.

25. A method for wireless communications, comprising:
    receiving, from a base station at a user equipment (UE) comprising a first antenna and a second antenna for transmitting an acknowledgement (ACK), a downlink control channel comprising at least one control channel element (CCE);
    receiving, from the base station at the UE, a higher layer configuration;
    determining, at the UE, based at least in part on a first CCE of the at least one CCE, the first CCE used for transmission of a corresponding downlink control information (DCI) assignment, a first orthogonal resource for transmitting the ACK on a first uplink control channel transmission via the first antenna of the UE; and
    determining, at the UE, based at least in part on the higher layer configuration, a second orthogonal resource for transmitting the ACK on a second uplink control channel transmission via the second antenna of the UE, wherein the first orthogonal resource is different from the second orthogonal resource.

26. The method of claim 25, further comprising transmitting, from the at least two antennas, an uplink control channel signal using at least the first orthogonal resource and the second orthogonal resource.

27. The method of claim 25, wherein the downlink control channel is a Physical Downlink Control Channel (PDCCH).

28. An apparatus for wireless communications, comprising:

means for receiving, from a base station at a user equipment (UE) comprising a first antenna and a second antenna for transmitting an acknowledgement (ACK), a downlink control channel comprising at least one control channel element (CCE);

means for receiving, from the base station at the UE, a higher layer configuration;

means for determining, at the UE, based at least in part on a first CCE of the at least one CCE, the first CCE used for transmission of a corresponding downlink control information (DCI) assignment, a first orthogonal resource for transmitting the ACK on a first uplink control channel transmission via the first antenna of the UE; and means for determining, at the UE, based at least in part on the higher layer configuration, a second orthogonal resource for transmitting the ACK on a second uplink control channel transmission via the second antenna of the UE, wherein the first orthogonal resource is different from the second orthogonal resource.

29. The apparatus of claim 28, further comprising means for transmitting, from the at least two antennas, an uplink control channel signal using at least the first orthogonal resource and the second orthogonal resource.

30. The apparatus of claim 28, wherein the downlink control channel is a Physical Downlink Control Channel (PDCCH).

31. A user equipment (UE) comprising a first antenna and a second antenna for transmitting an acknowledgement (ACK) for wireless communications, comprising:
a memory module; and
at least one processor coupled to the memory module, the at least one processor configured to:
receive, from a base station, a downlink control channel comprising at least one control channel element (CCE);
receive, from the base station, a higher layer configuration;
determine, based at least in part on a first CCE of the at least one CCE and the higher layer configuration, the first CCE used for transmission of a corresponding downlink control information (DCI) assignment, a first orthogonal resource for transmitting the ACK on a first uplink control channel transmission via the first antenna of the UE; and
determine based at least in part on the higher layer configuration, a second orthogonal resource for transmitting the ACK on a second uplink control channel transmission via the second antenna of the UE, wherein the first orthogonal resource is different from the second orthogonal resource.

32. The UE of claim 31, wherein the at least one processor is further configured to transmit, from the at least two antennas, uplink control channel signal using at least the first orthogonal resource and the second orthogonal resource.

33. The UE of claim 31, wherein the downlink control channel is a Physical Downlink Control Channel (PDCCH).

34. A non-transitory computer-readable medium having non-transitory program code recorded thereon, the program code comprising:
program code to receive, from a base station at a user equipment (UE) comprising a first antenna and a second antenna for transmitting an acknowledgement (ACK), a downlink control channel comprising at least one control channel element (CCE);
program code to receive, from the base station at the UE, a higher layer configuration;
program code to determine, at the UE, based at least in part on a first CCE of the at least one CCE and the higher layer configuration, the first CCE used for transmission of a corresponding downlink control information (DCI) assignment, a first orthogonal resource for transmitting the ACK on a first uplink control channel transmission via the first antenna of the UE; and
program code to determine, at the UE, based at least in part on the higher layer configuration, a second orthogonal resource for transmitting the ACK on a second uplink control channel transmission via the second antenna of the UE, wherein the first orthogonal resource is different from the second orthogonal resource.

35. The non-transitory computer-readable medium of claim 34, wherein the program code further comprises program code to transmit, from the at least two antennas, an uplink control channel signal using at least the first orthogonal resource and the second orthogonal resource.

36. The non-transitory computer-readable medium of claim 34, wherein the downlink control channel is a Physical Downlink Control Channel (PDCCH).

* * * * *